United States Patent
Mathur

(10) Patent No.: US 7,913,813 B1
(45) Date of Patent: Mar. 29, 2011

(54) NOISE SHIELD FOR A LAUNCH VEHICLE

(75) Inventor: Gopal Prasad Mathur, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/582,898

(22) Filed: Oct. 21, 2009

(51) Int. Cl.
*E04B 1/82* (2006.01)

(52) U.S. Cl. .......... 181/290; 181/292; 181/294; 244/1 N

(58) Field of Classification Search .......... 181/290, 181/292, 293, 210, 212, 214; 415/119; 244/1 N
See application file for complete search history.

(56) References Cited

U.S. PATENT DOCUMENTS

| | | | | |
|---|---|---|---|---|
| 5,512,715 | A * | 4/1996 | Takewa et al. | 181/295 |
| 5,670,758 | A | 9/1997 | Borchers et al. | |
| 6,098,926 | A * | 8/2000 | Morgenthaler | 244/119 |
| 6,119,807 | A * | 9/2000 | Benson et al. | 181/208 |
| 6,231,710 | B1 | 5/2001 | Herup et al. | |
| 6,290,022 | B1 * | 9/2001 | Wolf et al. | 181/292 |
| 6,394,394 | B1 | 5/2002 | Raun et al. | |
| 6,772,859 | B2 * | 8/2004 | D'Antonio et al. | 181/293 |
| 6,951,264 | B2 * | 10/2005 | Byma et al. | 181/286 |
| 7,311,175 | B2 * | 12/2007 | Proscia et al. | 181/290 |
| 7,401,682 | B2 * | 7/2008 | Proscia et al. | 181/290 |
| 7,631,727 | B2 * | 12/2009 | Thomas et al. | 181/288 |
| 2003/0098200 | A1 * | 5/2003 | Clark | 181/292 |
| 2006/0060421 | A1 * | 3/2006 | Sarin et al. | 181/290 |
| 2009/0045009 | A1 * | 2/2009 | Chiou et al. | 181/290 |
| 2009/0152395 | A1 * | 6/2009 | Marze | 244/1 N |
| 2010/0148001 | A1 * | 6/2010 | Hoetzeldt et al. | 244/1 N |

OTHER PUBLICATIONS

Ardelean et al., "Chamber-core structures for fairing acoustic mitigation", Proceedings of SPIE vol. 5760, Bellingham, WA, 2005, pp. 361-369.

Esteve et al., "Adaptive Helmholtz resonators and passive vibration absorbers for cylinder interior noise control", Journal of Sound and Vibration 288, 2005, Elsevier Ltd., pp. 1105-1130.

* cited by examiner

*Primary Examiner* — Elvin G Enad
*Assistant Examiner* — Forrest M Phillips
(74) *Attorney, Agent, or Firm* — Yee & Associates, P.C.; James M. Poole

(57) ABSTRACT

An apparatus comprises a core having a first surface configured for attachment to a surface of a structure, a face sheet located over a second surface of the core, a number of cavities within an interior of the core, and a number of ports for the number of cavities. The number of ports provides communication between the number of cavities within the interior of the core and the exterior of the core. The number of cavities and the number of ports are configured to reduce noise traveling through the core.

29 Claims, 10 Drawing Sheets

NOISE SHIELD FOR A LAUNCH VEHICLE

BACKGROUND INFORMATION

1. Field

The present disclosure relates generally to noise and, in particular, to reducing noise radiated by a structure. Still more particularly, the present disclosure relates to a method and apparatus for reducing noise radiated by composite and metallic structures of a launch vehicle.

2. Background

A launch vehicle is used to carry a payload from the surface of the earth into outer space. A launch vehicle may take the form of a rocket, a space shuttle, or some other suitable vehicle that is capable of carrying the payload into outer space. The payload may be, for example, a satellite or some other object that may be carried into outer space. This object may be, for example, an electronics system, a person, or some other suitable object.

With respect to operating a launch vehicle, noise generated by the launch vehicle is a concern in carrying a payload. When the launch vehicle takes the form of a rocket, a fairing may be used to enclose and/or protect the payload. For example, a fairing protects the payload against the impact of the atmosphere and may maintain a desired environment for the payload. Once outside of the atmosphere, the fairing is jettisoned or moved to expose the payload. The payload may then be separated from the launch vehicle into an orbit.

Noise shields may be employed in fairings or payloads to reduce the noise and vibrations that the payload may be exposed to during the flight of the launch vehicle.

The noise levels generated by launch vehicles may exceed 160 decibels during a launch, such as a satellite. Currently, noise control treatments may be attached to the fairings to reduce the noise inside of the fairings where the payload is located. Currently used systems include placing sound-absorbing materials on the walls of the fairings. These sound-absorbing materials may be, for example, insulating panels or mats. Additionally, some fairings may involve multiple layers of shells in which damping materials are located between the shells of the fairing. Additionally, foam blankets also may be used within the fairing.

These types of components, however, require space and increase the weight of the launch vehicle. As a result, the size and/or weight of the payload may be reduced. Additionally, these systems also increase the cost of a launch vehicle.

Therefore, it would be advantageous to have a method and apparatus that takes into account one or more of the issues discussed above, as well as possibly other issues.

SUMMARY

In one advantageous embodiment, an apparatus comprises a core having a first surface configured for attachment to a surface of a structure, a face sheet located over a second surface of the core, a number of cavities within an interior of the core, and a number of ports for the number of cavities. The number of ports provides communication between the number of cavities within the interior of the core and the exterior of the core. The number of cavities and the number of ports are configured to reduce noise traveling through the core.

In another advantageous embodiment, a noise reduction system for a launch vehicle comprises a core, a face sheet, and a number of acoustic resonators in the interior of the core. The core has a first surface configured for attachment to a surface of a fairing for the launch vehicle. The face sheet is located over a second surface of the core. The number of acoustic resonators is configured to reduce noise traveling through the core.

In yet another advantageous embodiment, a method is present for reducing noise. A structure is identified for noise reduction. A number of noise reduction devices is attached to the structure in which each noise reduction device in the number of noise reduction devices comprises a core, a face sheet, a number of cavities within an interior of the core, and a number of ports for the number of cavities. The core has a first surface configured for attachment to a surface of the structure. The face sheet is located over a second surface of the core. The number of ports provides communication between the number of cavities within the interior of the core and the exterior of the core. The number of cavities and the number of ports are configured to reduce the noise traveling through the core.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
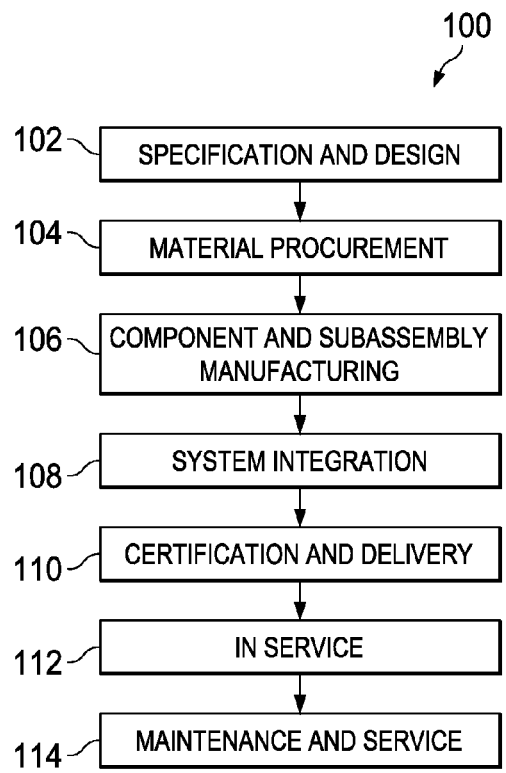
FIG. 1 is an illustration of a spacecraft manufacturing and service method in accordance with an advantageous embodiment.
Figure 2:
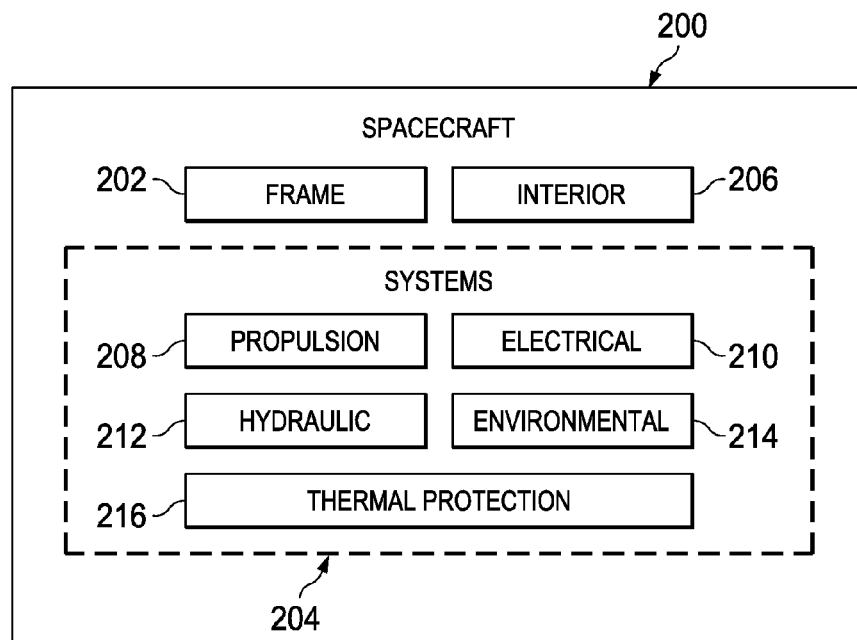
FIG. 2 is an illustration of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment. During pre-production, spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service 112 by a customer, spacecraft 200 in FIG. 2 is scheduled for maintenance and service 114, which may include modification, reconfiguration, refurbishment, and/or other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, an illustration of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and thermal protection system 216. Although an aerospace example is shown, different advantageous embodiments may be applied to other industries, such as the automotive industry.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1. As yet another example, number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while spacecraft 200 is in service 112 and/or during maintenance and service 114 in FIG. 1. The use of a number of the different advantageous embodiments may substantially expedite the assembly of and/or reduce the cost of spacecraft 200.

The different advantageous embodiments recognize and take into account a number of different considerations. For example, the different advantageous embodiments recognize and take into account that the noise and vibrations generated by a launch vehicle may cause various electronic devices and/or structures to operate incorrectly. These factors may be a primary cause of a payload operating incorrectly during or after the launch vehicle takes off.

The different advantageous embodiments recognize and take into account that composite sandwich structures have been used in fairings for launch vehicles, as well as other components for launch vehicles and other types of platforms. These types of components may reduce the weight of the fairing.

The different advantageous embodiments recognize and take into account that the composite structures may reduce the weight of the launch vehicle but have a higher stiffness as compared to using metallic structures. As a result, these composite structures generate more noise as compared to metallic structures.

The different advantageous embodiments also recognize and take into account that one solution to noise is to change the physics of the waves traveling through structures. The different advantageous embodiments recognize and take into account that reducing the speed of the waves propagating in these structures reduces the generation of noise.

For example, waves traveling in structures include bending waves and shear waves. At least one of bending waves and shear waves propagating through a structure may be reduced in speed by attaching an apparatus or other device to the structure.

Thus, the different advantageous embodiments provide a method and apparatus for reducing noise. In one advantageous embodiment, an apparatus comprises a core having a first surface configured for attachment to a surface of a structure. A face sheet is located over a second surface of the core. A number of cavities is present within an interior of the core. Also, a number of ports is present for the number of cavities. The number of ports provides communication between the number of cavities within the interior of the core and the exterior of the core. The number of cavities and the number of ports are configured to reduce noise traveling through the core.

Figure 3:
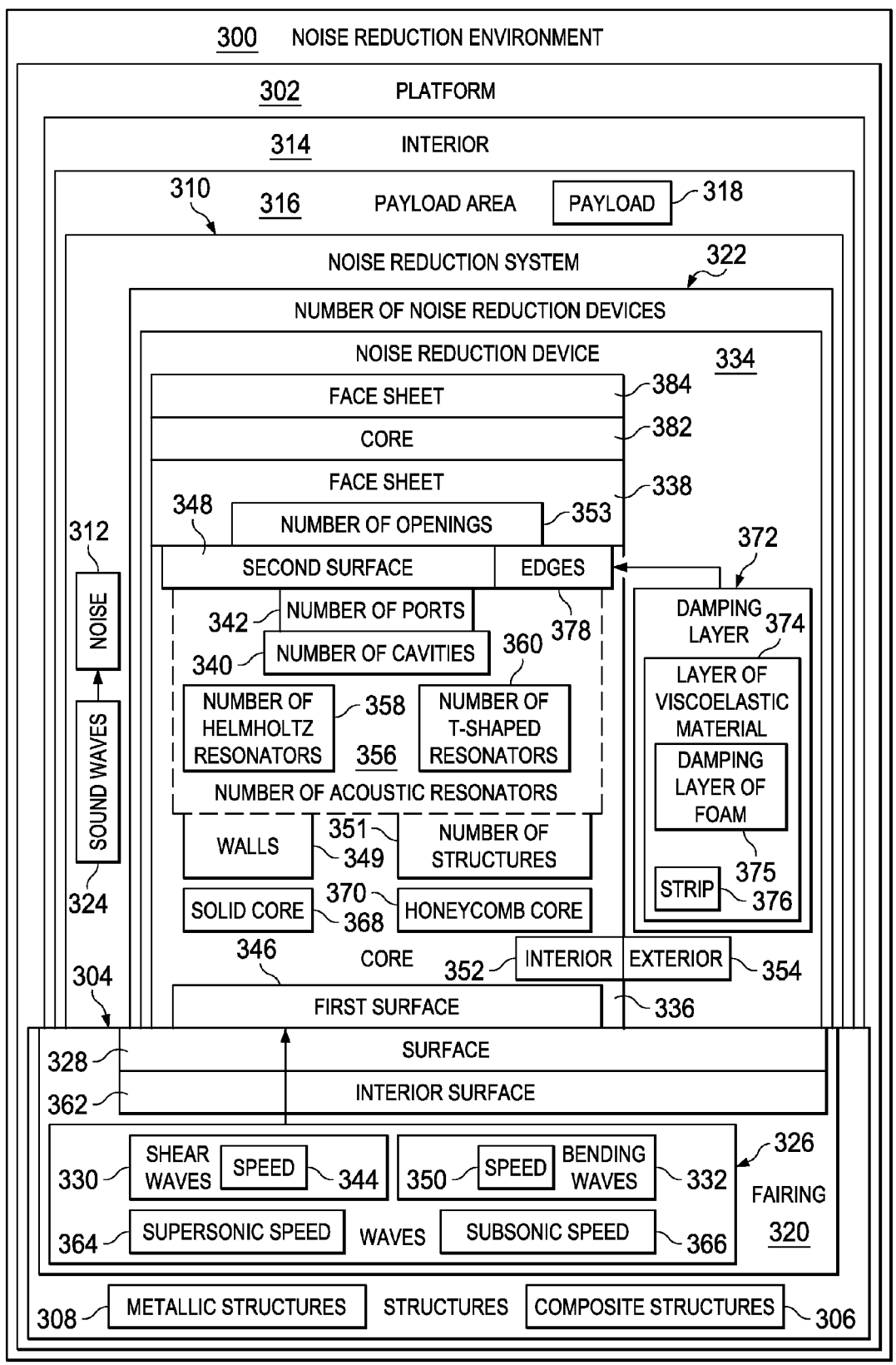
FIG. 3 is an illustration of a noise reduction environment in accordance with an advantageous embodiment.

With reference now to FIG. 3, an illustration of a noise reduction environment is depicted in accordance with an advantageous embodiment. In this illustrative example, noise reduction environment 300 is an example of an environment that may be implemented with spacecraft 200 in FIG. 2.

Noise reduction environment 300 includes platform 302, which may take the form of spacecraft 200 in FIG. 2. Platform 302 is comprised of structures 304. In these illustrative examples, structures 304 include at least one of composite structures 306 and metallic structures 308.

Noise reduction system 310 is associated with platform 302 to reduce noise 312 within interior 314 of platform 302. A first component may be considered to be associated with a second component by being secured to the second component, bonded to the second component, fastened to the second component, and/or connected to the second component in some other suitable manner. The first component also may be connected to the second component through using one or more additional components. The first component also may be considered to be associated with the second component by being formed as part of and/or an extension of the second component.

Interior 314 may be payload area 316 in which payload 318 is located. Payload 318 may be, for example, without limitation, a satellite, a spacecraft, a part of a space station, or some other suitable type of payload. Fairing 320 may be a structure within structures 304 that protects payload area 316.

In these illustrative examples, noise reduction system 310 may be associated with fairing 320 to reduce noise 312 within payload area 316.

Noise reduction system 310 may include number of noise reduction devices 322. Number of noise reduction devices 322 may be attached to composite structures 306 and/or metallic structures 308 to reduce noise 312 generated by sound waves 324. Number of noise reduction devices 322 may be associated with structures 304. In other words, number of noise reduction devices 322 may be attached directly or indirectly to structures 304.

In these depicted examples, sound waves 324 radiate from structures 304 and/or platform 302. Sound waves 324 are formed when waves 326 pass through surface 328 of structures 304 and radiate into interior 314. Waves 326 include shear waves 330 and bending waves 332. In the illustrative examples, noise 312 is generated by the coupling of energy present in bending waves 332 with the energy present in shear waves 330 when sound waves 324 are formed.

In these illustrative examples, noise reduction device 334 in number of noise reduction devices 322 comprises core 336, face sheet 338, number of cavities 340, and number of ports 342.

In these illustrative examples, face sheet 338 is a layer that covers core 336. Face sheet 338 may be directly attached to core 336 or indirectly attached with some other number of layers between core 336 and face sheet 338 in these illustrative examples.

Core 336 is configured to reduce speed 344 of shear waves 330 traveling through core 336. Core 336 has first surface 346, which is configured for attachment to surface 328 in structures 304. Face sheet 338 is located over second surface 348 of core 336. Face sheet 338 is configured to reduce speed 350 of bending waves 332 traveling through face sheet 338. First surface 346 is substantially parallel to second surface 348 in these illustrative examples.

In these illustrative examples, number of cavities 340 and number of ports 342 may be formed in walls 349 in interior 352 of core 336. Walls 349 may be used when walls 349 are comprised of and/or coated with a material that may resist or prevent air from moving through walls 349. In other advantageous embodiments, number of cavities 340 and number of ports 342 may be formed using number of structures 351. In these illustrative examples, number of ports 342 may, in part, be formed by number of openings 353 in face sheet 338.

In these illustrative examples, number of ports 342 absorbs noise 312. Number of ports 342 may act as a resistor, while number of cavities 340 may function as a capacitor. As air or gases are pushed in and out of number of ports 342, number of ports 342 absorbs noise 312 at different frequencies.

Number of ports 342 provides communication between number of cavities 340 in interior 352 of core 336 and exterior 354 of core 336. For example, if number of ports 342 is located on second surface 348, second surface 348 is part of exterior 354 of core 336.

Additionally, a cavity within number of cavities 340 may have more than one port to provide communication. In these examples, number of ports 342 provides communication between number of cavities 340 within interior 352 of core 336 and exterior 354 of core 336 by providing an opening or channel from number of cavities 340 to exterior 354. In these examples, number of cavities 340 and number of ports 342 are configured to reduce noise 312 traveling through core 336.

Number of cavities 340 and number of ports 342 may take various forms. For example, number of cavities 340 and number of ports 342 may form number of acoustic resonators 356. Number of acoustic resonators 356 may include at least one of number of Helmholtz resonators 358, number of T-shaped resonators 360, and/or other suitable types of resonators that reduce noise. Number of Helmholtz resonators 358 and/or number of T-shaped resonators 360 may be used to control or reduce noise at frequencies from about 20 hertz to about 80 hertz. These resonators may be used to reduce noise at other frequencies, depending on the particular implementation and configuration of the resonators. In some advantageous embodiments, number of cavities 340 may comprise an absorptive material, such as foam. The absorptive material may be used to increase the range of frequencies at which noise is reduced by number of acoustic resonators 356.

These types of resonators have a cavity with a volume that is larger than compared to the volume of the port. The volume of the cavity relative to the volume of the port may vary, depending on the particular frequency for which noise reduction is desired.

The length of these types of resonators may be selected based on the wavelength for which noise control may be desired. In addition to controlling frequencies from about 20 hertz to about 80 hertz, these types of acoustic resonators also may control noise at other frequencies as a result of modal coupling.

Number of noise reduction devices 322 may have various shapes and sizes. In one illustrative example, noise reduction device 334 may conform to interior surface 362 of fairing 320. Noise reduction device 334 may take the form of a single layer that conforms to all of interior surface 362 for each part of fairing 320. In other advantageous embodiments, noise reduction device 334 may take the form of a tile having various shapes, such as square, rectangular, hexagonal, irregular, or some other suitable shape.

In these illustrative examples, shear waves 330 are waves that move in a direction substantially perpendicular to surface 328 of structures 304, first surface 346 of core 336, second surface 348 of core 336, and other surfaces that may be present in platform 302. Shear waves 330 cause vibrations in core 336 that are substantially perpendicular to the movement of shear waves 330. The movement of shear waves 330 through structures 304 and/or core 336 is taken into account in determining the configuration for core 336 in these illustrative examples. Bending waves 332 are waves that move substantially parallel to or substantially in the direction of surface 328 of structures 304, first surface 346 of core 336, second surface 348 of core 336, and/or other surfaces in platform 302.

In these illustrative examples, noise reduction device 334 reduces noise 312 in interior 314 of platform 302. In particular, reduction of noise 312 may be performed using noise reduction device 334 for payload area 316 to reduce noise 312 that reaches payload 318.

This noise reduction is performed in a different manner from other currently used devices, which employ absorptive materials, such as foam. The absorptive materials convert energy produced by sound waves radiating from the structure into heat. This conversion may be achieved in the different advantageous embodiments through the deformation of shear waves through the structure.

In the different advantageous embodiments, number of noise reduction devices 322 reduces the speed of waves 326 by an amount that reduces noise 312 within interior 314 of platform 302.

The reduction in the speed of waves 326 may be to less than the speed of sound in these examples. For example, the speed of waves 326 may be reduced to a speed that is substantially two thirds the speed of sound. This reduction in speed may be desired, because number of noise reduction devices 322 is comprised of materials that are less stiff as compared to materials in structures 304. As a result, waves 326 slow down in speed when propagating from structures 304 to number of noise reduction devices 322.

With composite structures 306, core 336 may be configured to reduce the speed of waves 326 with respect to resonant modes of bending waves 332. With metallic structures 308, core 336 may be configured to reduce the speed of waves 326 with respect to non-resonant modes of bending waves 332. In this manner, number of noise reduction devices 322 is configured to transfer the energy in bending waves 332 traveling through structures 304 into energy in shear waves 330. More specifically, the energy in bending waves 332 traveling at supersonic speed 364 may be transferred into energy in shear waves 330 traveling at subsonic speed 366.

In these illustrative examples, supersonic speed 364 is a speed that is greater than the speed of sound. This speed is about 767 miles per hour in dry air at about 68 degrees Fahrenheit or about 343 meters per second at about 20 degrees Celsius. A speed lower than about 767 miles per hour is subsonic speed 366. One result of this type of transfer of energy from bending waves 332 into energy in shear waves 330 is a reduction in noise 312 in interior 314.

In the different advantageous embodiments, core 336 may take a number of different forms. For example, core 336 may be, without limitation, solid core 368, honeycomb core 370, or some other suitable type of core. In some examples, core 336 may be a truss core, an X-core, a K-core, a Kevlar™ core, a Nomex™ core, or some other suitable type of core. These different cores may be comprised of materials such as, for example, without limitation, foam, paper, melamine foam, polymeric compound foam, aramid fiber paper, para-aramid fiber paper, and/or some other suitable material. Further, the different cores may be comprised of materials that allow shear waves 330 to travel through core 336 with subsonic speed 366.

Face sheet 338 may be constructed from a number of different types of materials. The particular material is selected as one that reduces bending waves 332 traveling through face sheet 338. These materials may include materials such as, for example, without limitation, aluminum, other types of metals, glass, carbon fiber, graphite fiber, Kevlar® fiber, composite materials, and/or other suitable types of materials. The thickness of face sheet 338 may be selected based on the type of material, weight, environmental factors, vibration frequencies, and/or other suitable factors.

Number of structures 351 for number of cavities 340 and number of ports 342 may be comprised of a number of different types of materials. In these examples, the materials may be selected from a material that resists or prevents air from moving through the material. In one example, number of structures 351 may be comprised of a material selected for face sheet 338. In other advantageous embodiments, number of structures 351 may be comprised of polyvinyl chloride, plastic, and/or other suitable materials. The materials selected for number of structures 351 may not need to be rigid if the material is associated with or secured to the walls of core 336.

Further, in addition to number of noise reduction devices 322, noise reduction system 310 may include other components. These components may include, for example, foam blankets, fiberglass blankets, and/or other suitable components.

In some advantageous embodiments, noise reduction device 334 may include additional layers. For example, damping layer 372 may be located between face sheet 338 and core 336. Damping layer 372 may be, for example, without limitation, a layer of viscoelastic material. A viscoelastic material is a material that exhibits both viscous and elastic characteristics when undergoing deformation. In these illustrative examples, damping layer 372 may be implemented using, for example, layer of viscoelastic material 374. Layer of viscoelastic material 374 may cover all of second surface 348 of core 336. In this illustrative example, layer of viscoelastic material 374 may be damping layer of foam 375. Damping layer of foam 375 is a layer of foam in which the foam has viscoelastic properties. Damping layer of foam 375 reduces noise 312 and vibrations from structures 304.

In some advantageous embodiments, damping layer of foam 375 may take the form of strip 376 that may cover edges 378 around second surface 348. In these examples, damping layer of foam 375 may provide contact between core 336 and surface 328 of structures 304. Damping layer of foam 375 may be implemented using, for example, a foam in the ISODAMP® C-3000 Series of energy-absorbing foams, which is available from Aearo Technologies, Inc., a 3M Company.

In addition, in other advantageous embodiments, additional cores and face sheets may be placed in layers in addition to core 336 and face sheet 338 to form noise reduction device 334. For example, without limitation, structures 304 may have a thickness or stiffness such that an additional core may be used in noise reduction device 334 to reduce noise 312. In this depicted example, core 382 may be located over face sheet 338 with face sheet 384 located over core 382.

The illustration of noise reduction environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, noise reduction system 310 may include other devices in addition to the ones illustrated to reduce noise 312. For example, active noise reduction devices may be employed in noise reduction system 310 to cancel waves 326 to reduce noise 312.

In some advantageous embodiments, number of noise reduction devices 322 may be used in other platforms other than spacecraft. For example, these platforms may be selected from one of a mobile platform, a stationary platform, a land-based structure, an aquatic-based structure, a space-based structure, a surface ship, a tank, a personnel carrier, a train, a space station, a submarine, an automobile, a power plant, a house, a manufacturing facility, an office building, and/or some other suitable type of platform.

Figure 4:
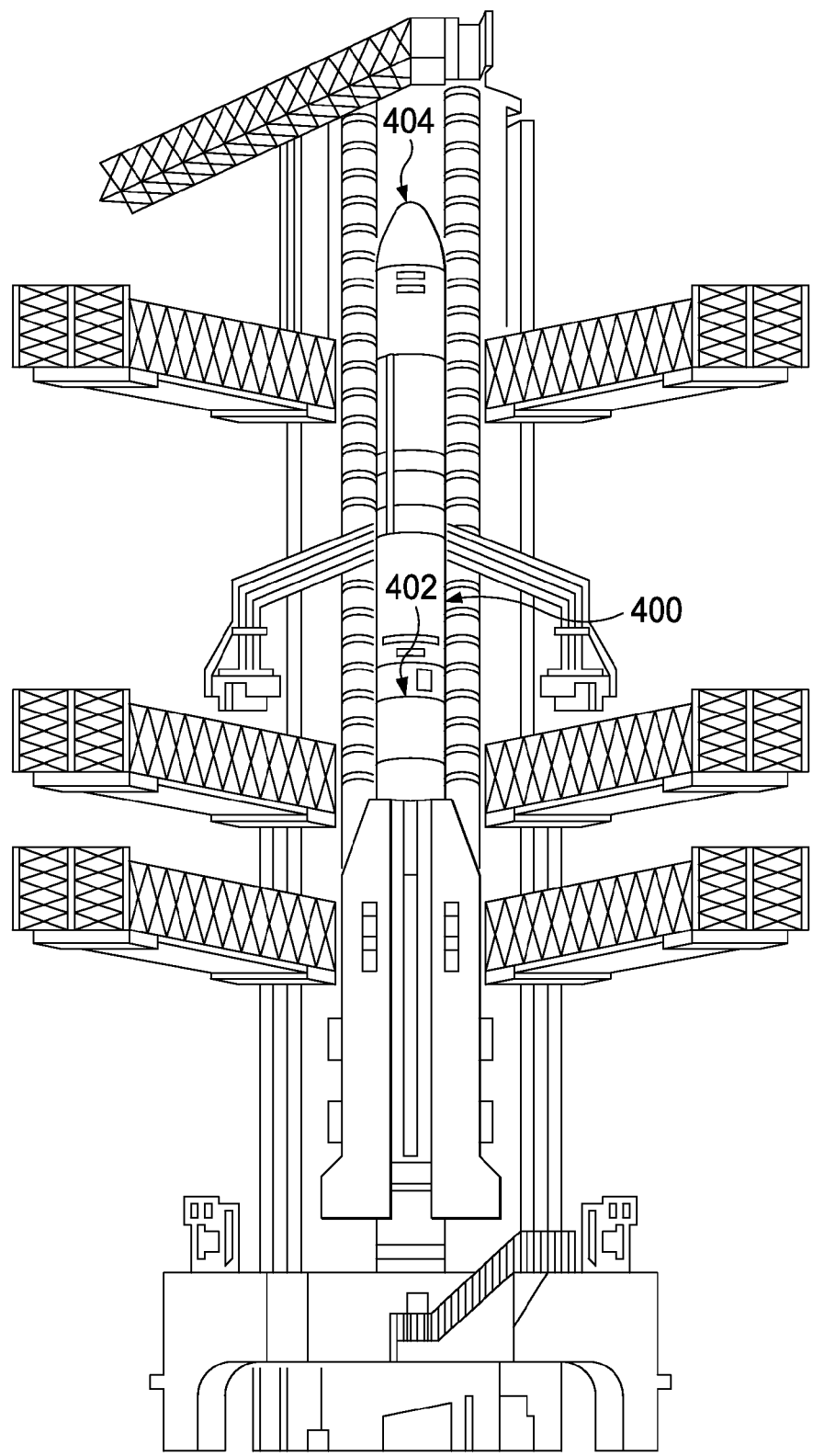
FIG. 4 is an illustration of a platform in accordance with an advantageous embodiment.

With reference now to FIG. 4, an illustration of a platform is depicted in accordance with an advantageous embodiment. In this illustrative example, platform 400 takes the form of launch vehicle 402. Launch vehicle 402 is an example of one implementation for spacecraft 200 in FIG. 2. In this illustrative example, launch vehicle 402 has fairing 404. One or more advantageous embodiments may be implemented in fairing 404 to reduce noise that may be exposed to a payload inside of fairing 404.

Figure 5:
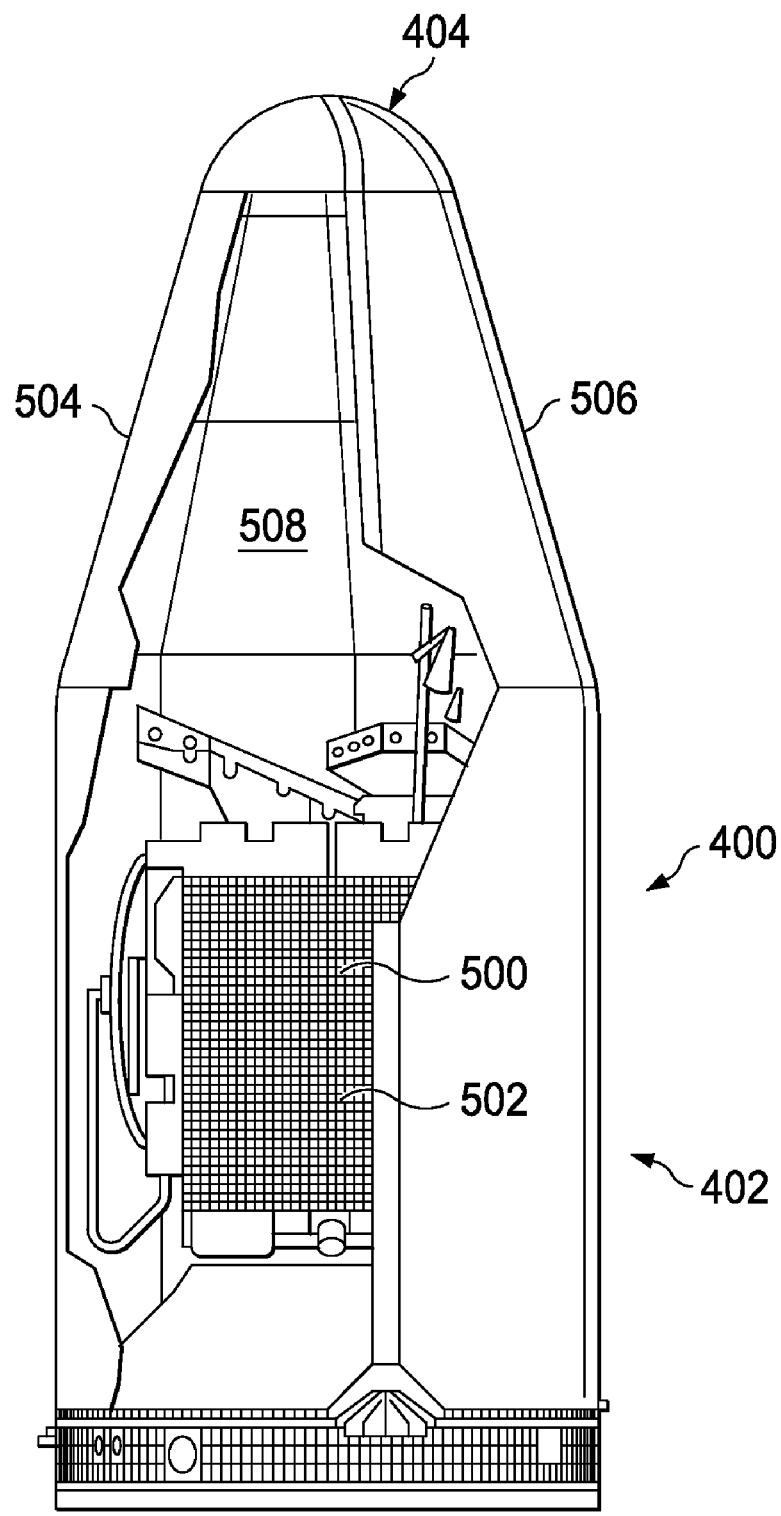
FIG. 5 is an illustration of a portion of a launch vehicle in accordance with an advantageous embodiment.

With reference now to FIG. 5, an illustration of a portion of launch vehicle 402 is depicted in accordance with an advantageous embodiment. In this illustrative example, an exposed view of fairing 404 is depicted. In this exposed view, payload 500 may be located inside of fairing 404. Payload 500, in this example, may take the form of satellite 502. As can be seen in this illustration, fairing 404 may have part 504 and part 506, which may separate to expose payload 500. This separation may occur when payload 500 is to be separated from launch vehicle 402. In this illustrative example, noise reduction system 508 may be located on each part of fairing 404. Noise reduction system 508 is an example of one implementation of noise reduction system 310 in FIG. 3.

Figure 6:
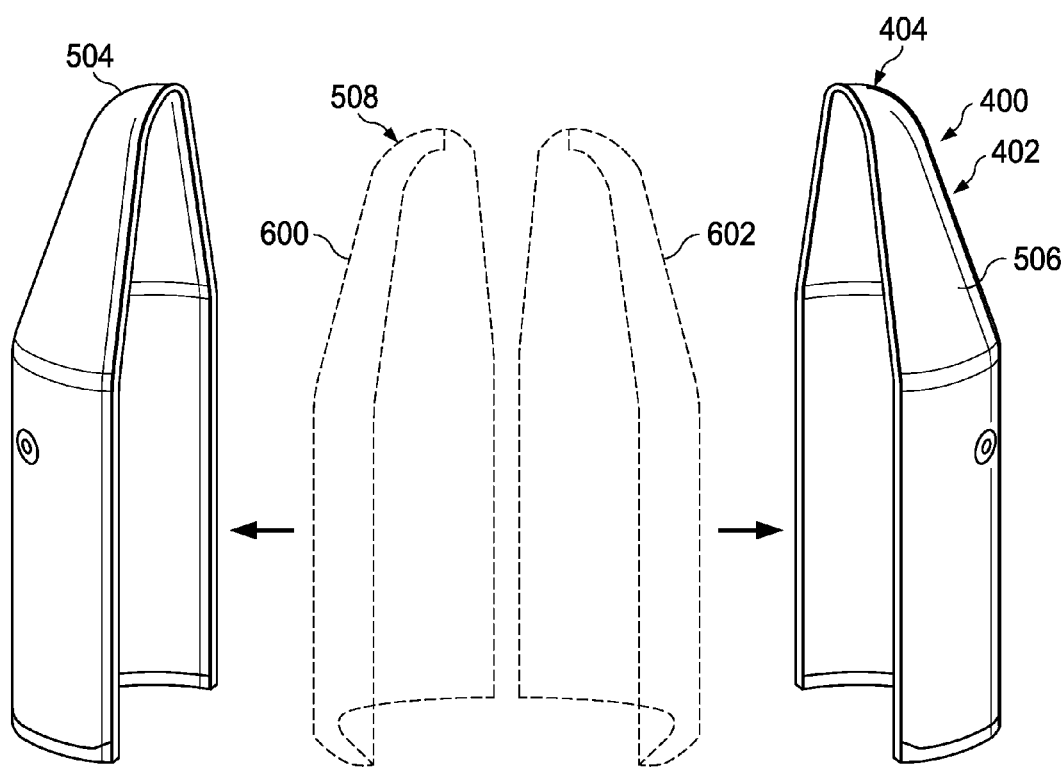
FIG. 6 is an illustration of a fairing with a noise reduction system in accordance with an advantageous embodiment.

With reference now to FIG. 6, an illustration of a fairing with a noise reduction system is depicted in accordance with an advantageous embodiment. In this illustration, fairing 404 is shown in an exploded view. In this view, noise reduction system 508 has section 600 and section 602. Section 600 is associated with part 504, while section 602 is associated with part 506 of fairing 404 in these examples.

The illustrations of fairing 404 in FIGS. 4-6 are not meant to imply physical or architectural limitations to the manner in which different fairings may be implemented. For example, other implementations of fairing 320 in FIG. 3 may have different shapes and sizes other than that shown for fairing 404. In addition, in other advantageous embodiments, fairing 320 may have three parts, four parts, or some other number of parts instead of part 504 and part 506 illustrated for fairing 404.

Further, noise reduction system 508 is shown with two sections, section 600 and section 602. These sections are illustrated as conforming to the shape of part 504 and part 506 of fairing 404. In other words, section 600 has a shape similar to part 504, and section 602 has a shape similar to part 506. These shapes allow for the sections to be placed or secured against the parts. In other advantageous embodiments, noise reduction system 508 may be comprised of a plurality of tiles that are attached to part 504 and part 506.

Figure 7:
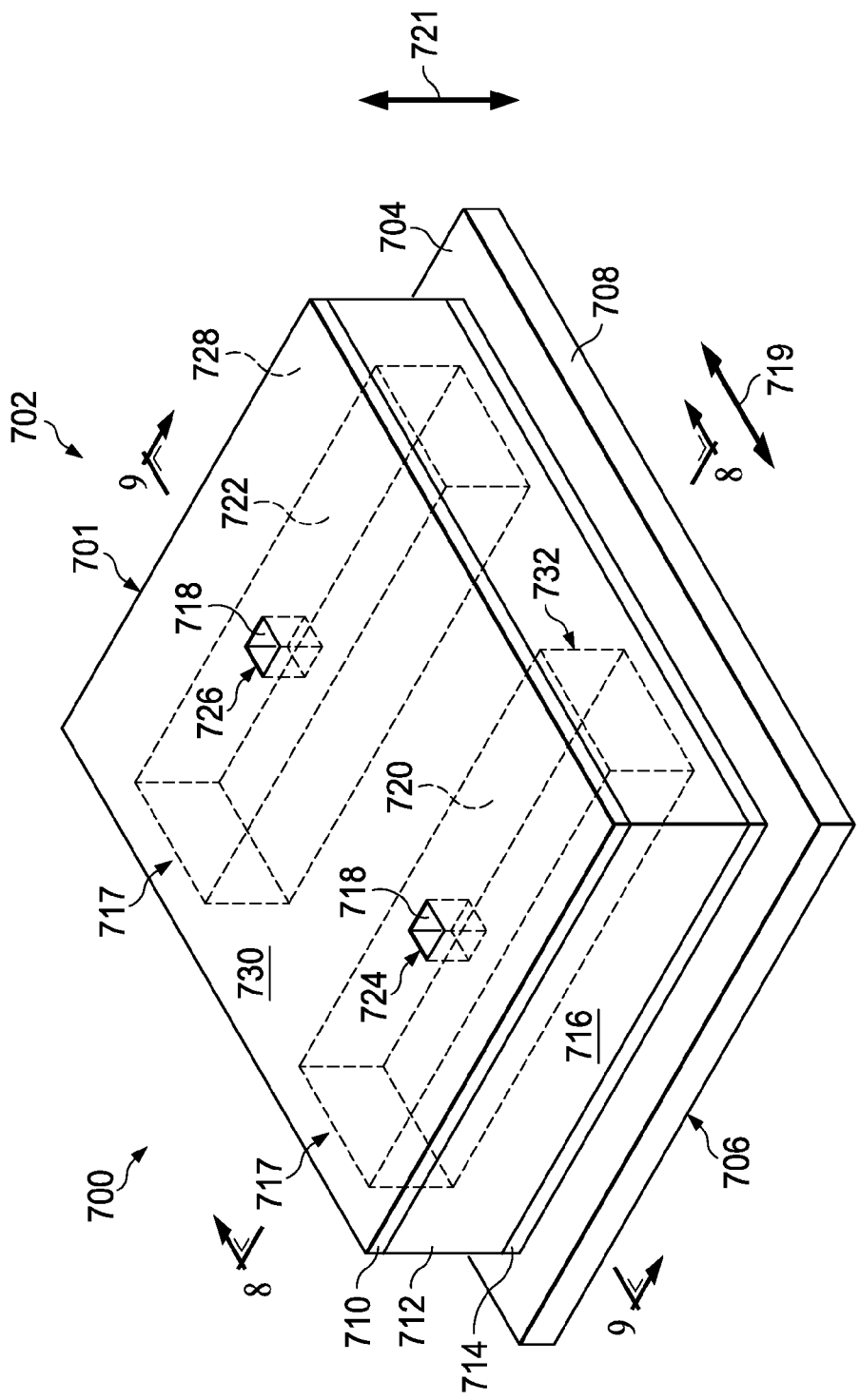
FIG. 7 is an illustration of a portion of a noise reduction environment in accordance with an advantageous embodiment.

Turning now to FIG. 7, an illustration of a portion of a noise reduction environment is depicted in accordance with an advantageous embodiment. In this illustrative example, a portion of noise reduction environment 700 is illustrated. Noise reduction environment 700 is an example of one implementation for noise reduction environment 300 in FIG. 3.

In this depicted example, noise reduction system 701 takes the form of noise reduction device 702. As depicted, noise reduction device 702 is associated with surface 704 of structure 706. In this illustrative example, structure 706 takes the form of fairing 708. Fairing 708 is an example of one implementation of fairing 320 in FIG. 3. As another example, structure 706 may be for part 504 for fairing 404 in FIG. 5.

Noise reduction device 702 is shown in a partially exposed perspective view. Noise reduction device 702 is comprised of face sheet 710, core 712, and face sheet 714. Face sheet 710 may be referred to as an outer face sheet, while face sheet 714 may be referred to as an inner face sheet. Face sheet 714 is attached to surface 704 of fairing 708 in these examples. Core 712 is located between face sheet 710 and face sheet 714. Core 712, in this example, takes the form of foam core 716.

Foam core 716 contains number of cavities 717 and number of ports 718. In this example, number of cavities 717 comprises cavity 720 and cavity 722. Number of ports 718 comprises port 724 and port 726. Cavities 720 and 722 are located in interior 728 of core 712. Ports 724 and 726 provide communication between cavity 720 and cavity 722 in interior 728 of core 712 and exterior 730 of core 712. In these examples, port 724 provides communication for cavity 720. Port 726 provides communication for cavity 722. In these examples, these ports provide an opening or access for air and other gases to enter or exit cavities 720 and 722. Number of cavities 717 and number of ports 718 are configured to reduce noise traveling through core 712. These components may form acoustic resonators 732. Acoustic resonators 732 may be tuned to different frequencies, depending on the volume of number of cavities 717 and the size of number of ports 718.

In these illustrative examples, foam core 716 is configured to reduce a speed of shear waves traveling through foam core 716 in the direction of arrow 719. Face sheet 710 and face sheet 714 are configured to reduce a speed of bending waves traveling through face sheet 710 and face sheet 714 in the direction of arrow 721.

In these illustrative examples, shear waves traveling through core 712 affect the level of noise that radiates from face sheet 710 of noise reduction device 702 and causes noise that may be heard by a passenger. The speed of shear waves in core 712 may be defined as follows:

$$c_s = \left[\frac{G_c}{\rho_c}\right]^{1/2}$$

where $C_s$ is the speed of shear waves, $G_c$ is the shear modulus, and $\rho_c$ is the density of the core.

The speed of shear waves in core 712 may be reduced by selecting materials in the configurations for core 712. For example, in this illustrative example, core 712 takes the form of foam core 716. In other illustrative examples, core 712 may be a solid core.

Noise reduction system 701 is not required to carry the structural and dynamic loads in fairing 708. As a result, core 712 may be constructed with a shear modulus selected to allow shear waves to travel through core 712 at subsonic speeds. The particular material in the configuration selected for core 712 may be made by selecting the shear modulus and density for core 712 such that the speed of shear waves is reduced when the shear waves and/or bending waves travel from structure 706 to core 712 in noise reduction device 702.

Similarly, the materials in the configurations selected for face sheet 710 and face sheet 714 are made by selecting elastic moduli and densities for face sheet 710 and face sheet 714 such that the speed of bending waves is reduced when the bending waves and/or shear waves travel through face sheet 714 and face sheet 710.

The speed of bending waves traveling through face sheet 710 and face sheet 714 may be given by:

$$c_b = (\omega)^{1/2}\left[\frac{E_f h^2}{12\rho_f(1-v^2)}\right]^{1/4}$$

where $c_b$ is the speed of bending waves, $\omega$ is radian frequency or $2\pi$ times frequency, $E_f$ is the elastic modulus, $\rho_f$ is the density of material for the face sheet, $v$ is Poisson's ratio, and h is the thickness of the face sheet. This equation gives the speed of bending waves in face sheets made out of isotropic materials. Isotropic materials are materials which have the same properties in all directions.

The speed of bending waves in face sheets made out of orthotropic materials, such as orthotropic composite materials, may be calculated by determining a bending stiffness using finite element models. Orthotropic materials are materials with properties that may vary, depending on the direction in which the properties are measured. In other words, orthotropic materials are anisotropic materials.

In these examples, at low frequencies, the generation of noise is determined by the bending and/or vibrations of substantially all of noise reduction device 702. At high frequencies, the bending in face sheet 710 determines the level of noise generated. In the mid-frequencies, shear waves determine the level of noise generated. In these examples, low frequencies are frequencies that are lower than about 400 hertz. Mid-frequencies may be from about 400 hertz to about 3,000 hertz. High frequencies are frequencies that are greater than about 3,000 hertz. In other advantageous embodiments, noise reduction device 702 may be designed such that the low frequencies, the mid-frequencies, and/or the high frequencies have different ranges of frequencies.

Figure 8:
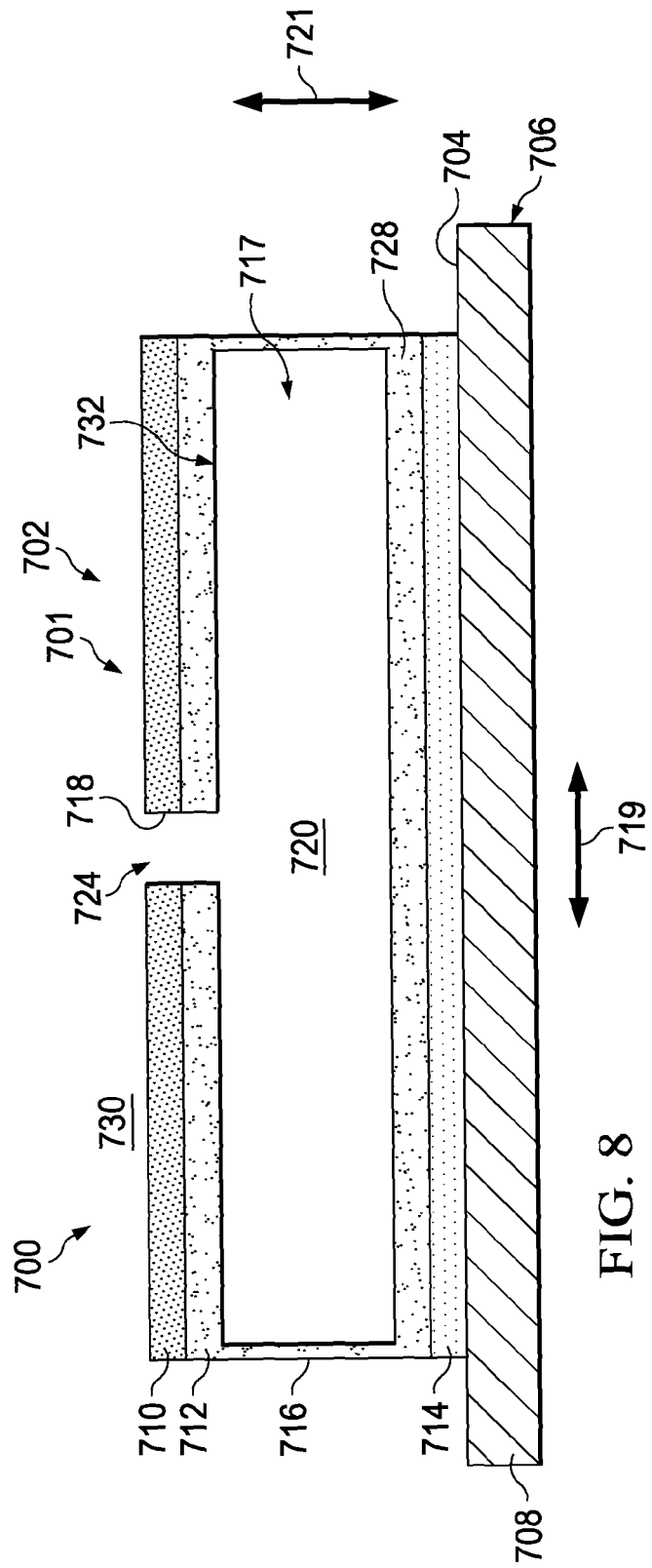
FIG. 8 is an illustration of a cross-sectional view of a noise reduction device in accordance with an advantageous embodiment.

Turning now to FIG. 8, an illustration of a cross-sectional view of a noise reduction device is depicted in accordance with an advantageous embodiment. In this illustrative example, noise reduction device 702 is shown in a cross-sectional view taken along lines 8-8 in FIG. 7.

Figure 9:
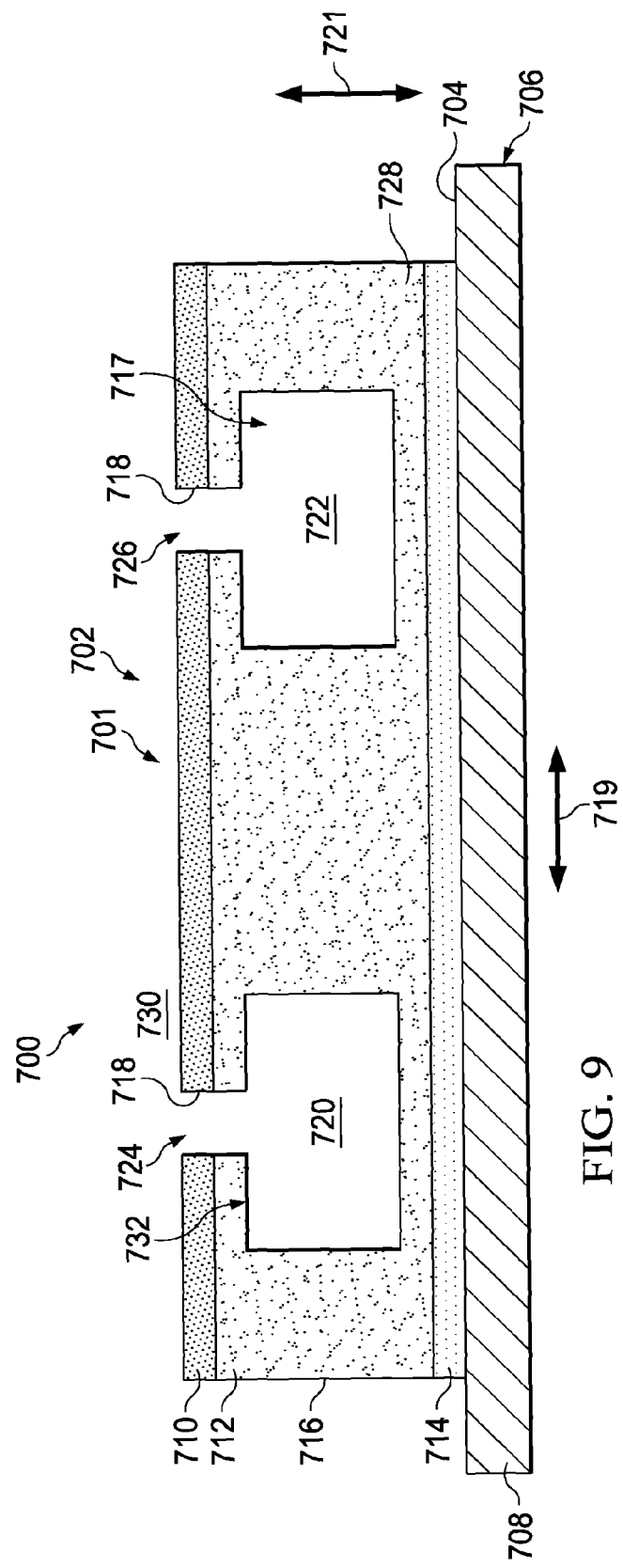
FIG. 9 is an illustration of a cross-sectional view of a noise reduction device in accordance with an advantageous embodiment.

With reference now to FIG. 9, an illustration of a cross-sectional view of a noise reduction device is depicted in accordance with an advantageous embodiment. In this illustration, noise reduction device 702 is shown in a cross-sectional view taken along lines 9-9 in FIG. 7.

Figure 10:
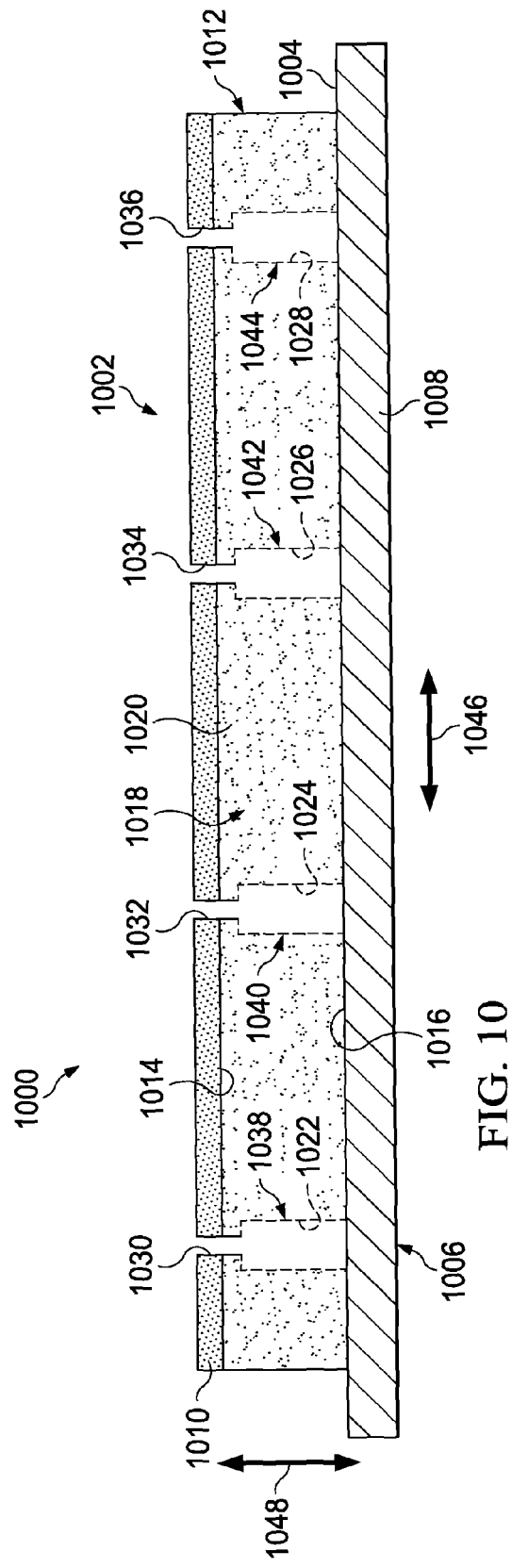
FIG. 10 is an illustration of a side view of a noise reduction device in accordance with an advantageous embodiment.

With reference now to FIG. 10, an illustration of a side view of a noise reduction device is depicted in accordance with an advantageous embodiment. In this illustrative example, noise reduction environment 1000 is an example of another implementation for noise reduction environment 300 in FIG. 3. As depicted, noise reduction environment 1000 includes noise reduction device 1002, which may be associated with surface 1004 of structure 1006. In this illustrative example, structure 1006 takes the form of fairing 1008.

In this illustrative example, noise reduction device 1002 comprises face sheet 1010 and core 1012. Core 1012 has side 1014 and side 1016. Additionally, in this illustrative example, side 1016 of core 1012 is directly attached to surface 1004 of fairing 1008. Side 1014 is attached to face sheet 1010. In this illustrative example, core 1012 takes the form of solid core 1018. In this example, solid core 1018 is comprised of material 1020.

Core 1012 has cavities 1022, 1024, 1026, and 1028. In this example, each cavity has a port. For example, cavity 1022 has port 1030, cavity 1024 has port 1032, cavity 1026 has port 1034, and cavity 1028 has port 1036. Of course, in other advantageous embodiments, these cavities may have more than one port.

Additionally, different cavities may have other numbers of ports as compared to other cavities, depending on the particular implementation. These cavities and ports form acoustic resonators 1038, 1040, 1042, and 1044.

In this illustrative example, waves traveling through structure 1006 may travel into noise reduction device 1002. The speed of the waves traveling from structure 1006 into noise reduction device 1002 is reduced. This reduction in speed is caused by bending and/or shear movement within noise reduction device 1002. In these illustrative examples, face sheet 1010 causes a reduction in the speed of waves traveling through face sheet 1010 in the direction of arrow 1046. These types of waves are bending waves. Core 1012 reduces the speed of shear waves traveling in the direction of arrow 1048 through core 1012. As a result, waves traveling through fairing 1008 may be slowed down in speed by noise reduction device 1002. This reduction in speed reduces the amount of noise that may be generated by or heard from structure 1006.

In these illustrative examples, acoustic resonators 1038, 1040, 1042, and 1044 also reduce noise that travels through core 1012. In the illustrative examples, these resonators may reduce or eliminate noise at different frequencies. In the different advantageous embodiments, each of the acoustic resonators may reduce noise in the same frequency or in different frequencies.

The illustrations of noise reduction device 702 and noise reduction device 1002 are not meant to imply physical or architectural limitations to the manner in which noise reduction devices may be implemented. Other components, in addition to or in place of the ones illustrated, may be used. Also, some components may be unnecessary in some advantageous embodiments. For example, in some advantageous embodiments, a noise reduction device may have a number of cores and a number of face sheets in addition to the ones illustrated in these examples.

Figure 11:
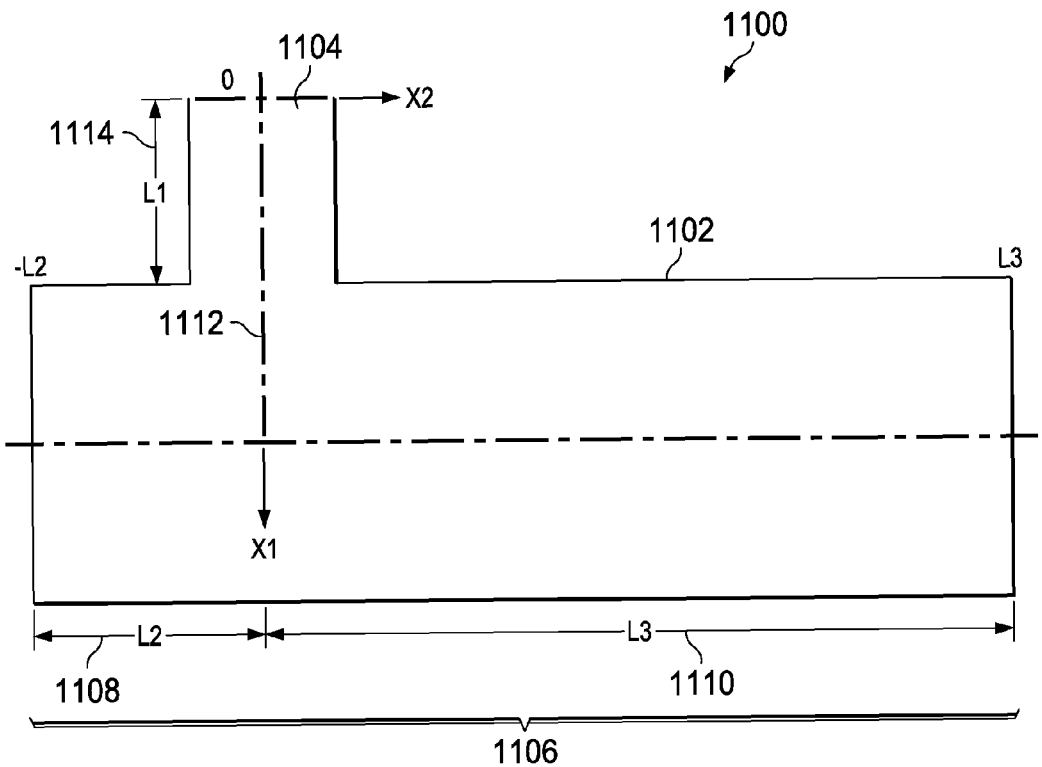
FIG. 11 is an illustration of a structure having a cavity and a port in accordance with an advantageous embodiment.

With reference now to FIG. 11, an illustration of a structure having a cavity and a port is depicted in accordance with an advantageous embodiment. In this illustrative example, structure 1100 has cavity 1102 and port 1104 and may be located within interior 352 of core 336 in FIG. 3. In these illustrative examples, structure 1100 may be an acoustic resonator in number of acoustic resonators 356. In this example, structure 1100 may be a T-shaped acoustic resonator. In these illustrative examples, structure 1100 has a number of different dimensions. Structure 1100 has length 1106, which is the sum of length L2 1108 and length L3 1110. In this illustrative example, length L2 1108 and length L3 1110 are measured from X1 axis 1112. These different lengths define cavity 1102. Port 1104 for structure 1100 has length L1 1114.

Figure 12:
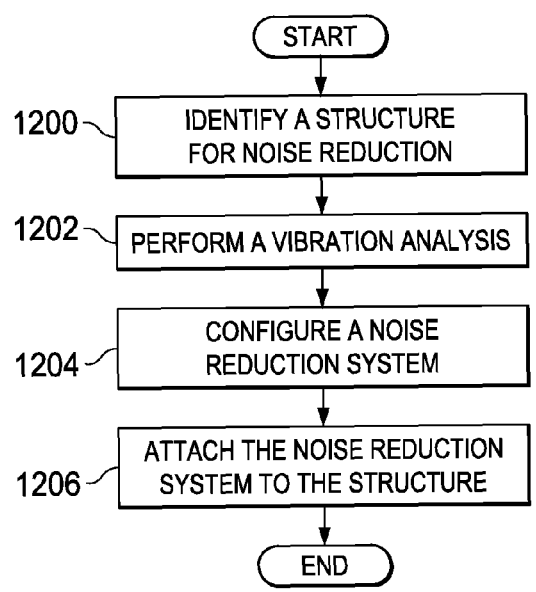
FIG. 12 is an illustration of a flowchart of a process for designing a noise reduction system in accordance with an advantageous embodiment.

With reference now to FIG. 12, an illustration of a flowchart of a process for designing a noise reduction system is depicted in accordance with an advantageous embodiment. The process illustrated in FIG. 12 may be implemented in a noise reduction system, such as noise reduction system 310 in noise reduction environment 300 in FIG. 3.

The process begins by identifying a structure for noise reduction (operation 1200). This structure may be, for example, a fairing for a launch vehicle or some other type of structure. Thereafter, vibration analysis is performed (operation 1202). In operation 1202, the vibration analysis may include determining characteristics of vibrations that may be formed in the structure or travel through the structure. These vibrations may be caused by waves traveling through the structure. Further, the vibration analysis also may be performed for different components of a noise reduction device. For example, the characteristics of vibrations that may be formed in a face sheet, a cavity, or a core may be identified.

The process then configures a noise reduction system (operation 1204). The configuration in operation 1204 may take into account a number of different factors. For example, without limitation, these factors are size constraints, weight constraints, a desired level of noise reduction, material constraints, and/or other suitable factors. For example, the noise reduction system may be configured to have a selected number of cores and ports comprised of a particular material. In some advantageous embodiments, a cavity may have more than one port. In yet other advantageous embodiments, a noise reduction system may have different cavities with different numbers of ports that are configured to reduce or absorb noise for different frequencies. Further, the cavities and ports may be formed by the walls of the core and the face sheet in some advantageous embodiments. In yet other advantageous embodiments, a number of structures may be placed inside of the core to provide the desired level of noise reduction.

Further, configuring the number of noise reduction devices also may include selecting a particular number of cores, a particular number of face sheets, and/or a particular number of damping layers. Configuring the number of noise reduction devices also may include selecting materials, thicknesses, dimensions, and other suitable factors for different components within the noise reduction system. Thereafter, the process attaches the noise reduction system to the structure (operation 1206), with the process terminating thereafter.

Thus, the different advantageous embodiments provide a method and apparatus for reducing noise. In one advantageous embodiment, an apparatus comprises a core, a face sheet, a number of cavities, and a number of ports. The core has a first configuration for attachment to a surface of a structure. The face sheet is located over a second surface of the core. The number of cavities is located within the interior of the core and the number of ports provides communication between the number of cavities within the interior of the core, and the exterior of the core. The number of cavities in the number of ports is configured to reduce noise traveling through the core.

In this manner, the noise reduction devices in the different advantageous embodiments reduce noise generated by a structure in the platform. Reduction in noise is achieved in a number of different ways. For example, the ports and cavities may reduce the noise traveling through a core. Additionally, the speed of waves traveling through a structure to the noise reduction device may be reduced through the use of materials that are less stiff in the noise reduction device as compared to those in the structure.

With one or more of the different advantageous embodiments, the use of other noise reduction devices may be avoided or reduced. The reduction or elimination of other noise reduction devices in a noise reduction system may reduce the weight and/or cost of these systems. Further, the reduction or elimination of other noise reduction devices may increase the payload or performance of the platform.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a core comprising a core material, the core having a first surface configured for attachment to a surface of a structure;
        a face sheet comprising a face sheet material, the face sheet located over a second surface of the core;
        a number of cavities within an interior of the core and formed within the core material;
        and a number of ports for the number of cavities, wherein the number of ports are formed in the core material and the face sheet material, and wherein the port has a diameter, wherein the port diameters are a consistent diameter through both the face sheet and the core material, the diameter of the port being less than the diameter of the cavity, and wherein the number of ports provides communication between the number of cavities within the interior of the core and an exterior of the core and wherein the number of cavities and the number of ports are configured to reduce noise traveling through the core.

2. The apparatus of claim 1, wherein the number of cavities and the number of ports for the number of cavities form a number of acoustic resonators.

3. The apparatus of claim 2, wherein the number of acoustic resonators comprises a number of Helmholtz resonators.

4. The apparatus of claim 1, wherein the number of cavities is formed by walls in the interior of the core and wherein the number of ports is formed by the walls in the interior of the core and a number of openings in the face sheet.

5. The apparatus of claim 1, wherein the number of cavities and the number of ports are formed by a number of structures located in the interior of the core.

6. The apparatus of claim 5, wherein the number of structures is comprised of a material selected from one of polyvinyl chloride, plastic, a metal, a composite material, and aluminum.

7. The apparatus of claim 1 wherein the core is substantially non load carrying.

8. The apparatus of claim 1 further comprising:
    a layer of viscoelastic material located at edges of the first surface of the core, wherein the layer of viscoelastic material is configured to attach the core to the surface of the structure to reduce vibrations in the structure.

9. The apparatus of claim 8, wherein the layer of viscoelastic material is a damping layer of foam.

10. The apparatus of claim 1, wherein the face sheet is a first face sheet and further comprising:
    a second face sheet located between the first surface of the core and the surface of the structure,
    wherein the first surface of the core is configured for attachment to the surface of the structure using the second face sheet.

11. The apparatus of claim 8, wherein the face sheet is a first face sheet and further comprising:
    a second face sheet located between the first surface of the core and the surface of the structure, wherein the layer of viscoelastic material is located between the second face sheet and the surface of the structure, and the first surface of the core is configured for attachment to the surface of the structure using the second face sheet and the layer of viscoelastic material.

12. The apparatus of claim 10, wherein the core is a first core and further comprising:
    a second core located between the second face sheet and the surface of the structure.

13. The apparatus of claim 12, wherein the number of cavities is a first number of cavities and the number of ports is a first number of ports and further comprising:
    a second number of cavities within an interior of the second core; and
    a second number of ports for the second number of cavities, wherein the second number of ports provides communication between the second number of cavities within the interior of the second core and an exterior of the second core, and wherein the second number of cavities and the second number of ports are configured to reduce the noise traveling through the second core.

14. The apparatus of claim 1, wherein the structure is a fairing for a launch vehicle and further comprising:
    the fairing, wherein the core, the face sheet, the number of cavities, and the number of ports form a noise shield for the fairing.

15. The apparatus of claim 1, wherein the core is comprised of a material selected from one of foam, paper, melamine foam, polymeric compound foam, aramid fiber paper, and para-aramid fiber paper.

16. The apparatus of claim 1, wherein the face sheet is comprised of a material selected from one of aluminum, metal, glass, carbon fiber, graphite fiber, para-aramid fiber, and a composite material.

17. The apparatus of claim 1, wherein the core is selected from one of a solid core and a honeycomb core.

18. The apparatus of claim 1, wherein the structure is for a platform selected from one of a mobile platform, a stationary platform, a land-based structure, an aquatic-based structure, a space-based structure, an aircraft, a surface ship, a tank, a personnel carrier, a train, a spacecraft, a space station, a submarine, an automobile, a power plant, a house, a stadium, a manufacturing facility, and an office building.

19. A noise reduction system for a launch vehicle, the noise reduction system comprising:
 a core comprising a core material, the core having a first surface configured for attachment to a surface of a fairing for the launch vehicle;
 a face sheet located over a second surface of the core; and
 a number of acoustic resonators in an interior of the core, within the core material, the number of acoustic resonators include ports, wherein each port has a diameter, wherein the port diameters are a consistent diameter through both the face sheet and the core material, the diameter of the port being less than the diameter of the resonator, and wherein the number of acoustic resonators is configured to reduce noise traveling through the core.

20. The noise reduction system of claim 19 further comprising:
 a layer of viscoelastic material located at edges of the first surface of the core, wherein the layer of viscoelastic material is configured to attach the core to the surface of the fairing.

21. The noise reduction system of claim 20, wherein the core, the face sheet, the number of acoustic resonators, and the layer of viscoelastic material form a noise reduction device.

22. The noise reduction system of claim 21 further comprising:
 a number of additional noise reduction devices configured for attachment to a fairing.

23. A method for reducing noise, the method comprising: identifying a structure for noise reduction; attaching a number of noise reduction devices to the structure in which each noise reduction device in the number of noise reduction devices comprises a core having a first surface configured for attachment to a surface of the structure; a face sheet located over a second surface of the core; a number of cavities within an interior of the core; and a number of ports for the number of cavities, wherein the ports have a diameter, wherein each port diameter is a consistent diameter through both the face sheet and the core material, the diameter of the port being less than the diameter of the cavity, wherein the number of ports provide communication between the number of cavities within the interior of the core and an exterior of the core, and wherein the number of cavities and the number of ports are configured to reduce the noise traveling through the core and reducing a speed of a sound wave traveling through the core.

24. The method of claim 23, wherein the number of cavities and the number of ports for the number of cavities form a number of acoustic resonators.

25. The method of claim 24, wherein the number of acoustic resonators comprises a number of Helmholtz resonators.

26. The method of claim 23, wherein the number of cavities is formed by walls in the interior of the core and wherein the number of ports is formed by the walls in the interior of the core and a number of openings in the face sheet.

27. The method of claim 23, wherein the number of cavities and the number of ports are formed by a number of structures located in the interior of the core.

28. The method of claim 23 wherein the step of reducing a speed of a sound wave traveling through the core further comprises reducing a speed of a shear wave traveling through the core.

29. The method of claim 23 wherein the step of reducing a speed of a sound wave traveling through the core further comprises reducing a speed of a bending wave traveling through the core.

* * * * *